(12) United States Patent
Lee et al.

(10) Patent No.: US 10,309,864 B1
(45) Date of Patent: Jun. 4, 2019

(54) EXTERIOR TUBING MONITORING DEVICES

(71) Applicant: Amazon Technologies, Inc., Seattle, WA (US)

(72) Inventors: Theodore Lee, Federal Way, WA (US); Felipe Enrique Ortega Gutierrez, Tacoma, WA (US); Dominic Lebaron, Issaquah, WA (US); Robert Mulyono, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 15/588,268

(22) Filed: May 5, 2017

(51) Int. Cl.
| G01M 3/36 | (2006.01) |
| G01M 3/40 | (2006.01) |
| F16L 55/00 | (2006.01) |
| G05D 7/06 | (2006.01) |

(52) U.S. Cl.
CPC ............ *G01M 3/40* (2013.01); *G05D 7/0623* (2013.01)

(58) Field of Classification Search
CPC ........... F16L 55/00; G01M 3/12; G01M 3/14; G01M 3/36; G01M 3/40; G05D 7/0623
See application file for complete search history.

(56) References Cited

U.S. PATENT DOCUMENTS

| 5,969,618 A | 10/1999 | Redmond |
| 2006/0196252 A1 | 9/2006 | Deckard |
| 2013/0220466 A1 * | 8/2013 | Zandiyeh .............. G01M 3/047 138/104 |

FOREIGN PATENT DOCUMENTS

| GB | 1503502 A | * | 3/1978 | ............ F16L 11/133 |
| JP | 2007177847 A | * | 7/2007 | .............. F16L 55/00 |

OTHER PUBLICATIONS

U.S. Appl. No. 15/588,337, filed May 5, 2017, Titled: Interior Tubing Monitoring Devices.

* cited by examiner

*Primary Examiner* — Nguyen Q. Ha
(74) *Attorney, Agent, or Firm* — Kilpatrick Townsend & Stockton LLP

(57) ABSTRACT

Systems, devices, and methods for monitoring flexible tubing connections are described. An example flexible tube device may include a pair of ends and an opening disposed at one of the ends. The opening may define a receiving section to receive a male fitting. The flexible tube may also include a sensing device extending around an exterior portion of the flexible tube at the receiving section. The sensing device may be configured to sense an expansion or a contraction of the flexible tube at the receiving section.

20 Claims, 3 Drawing Sheets

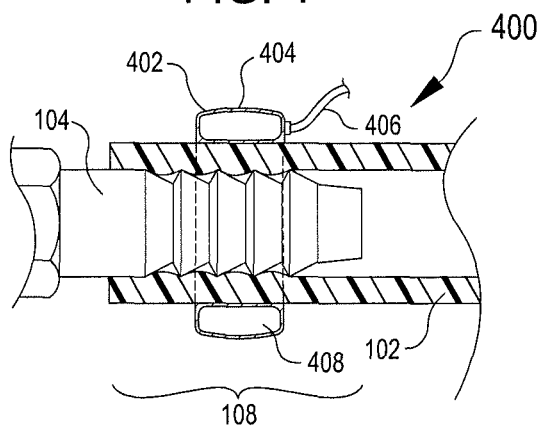
FIG. 4
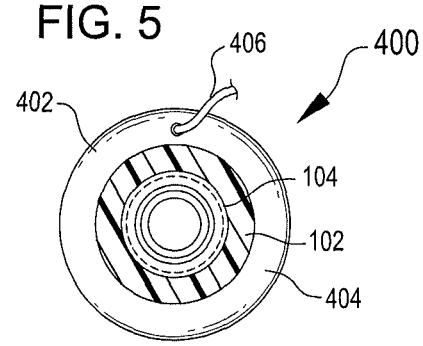
FIG. 5
FIG. 6
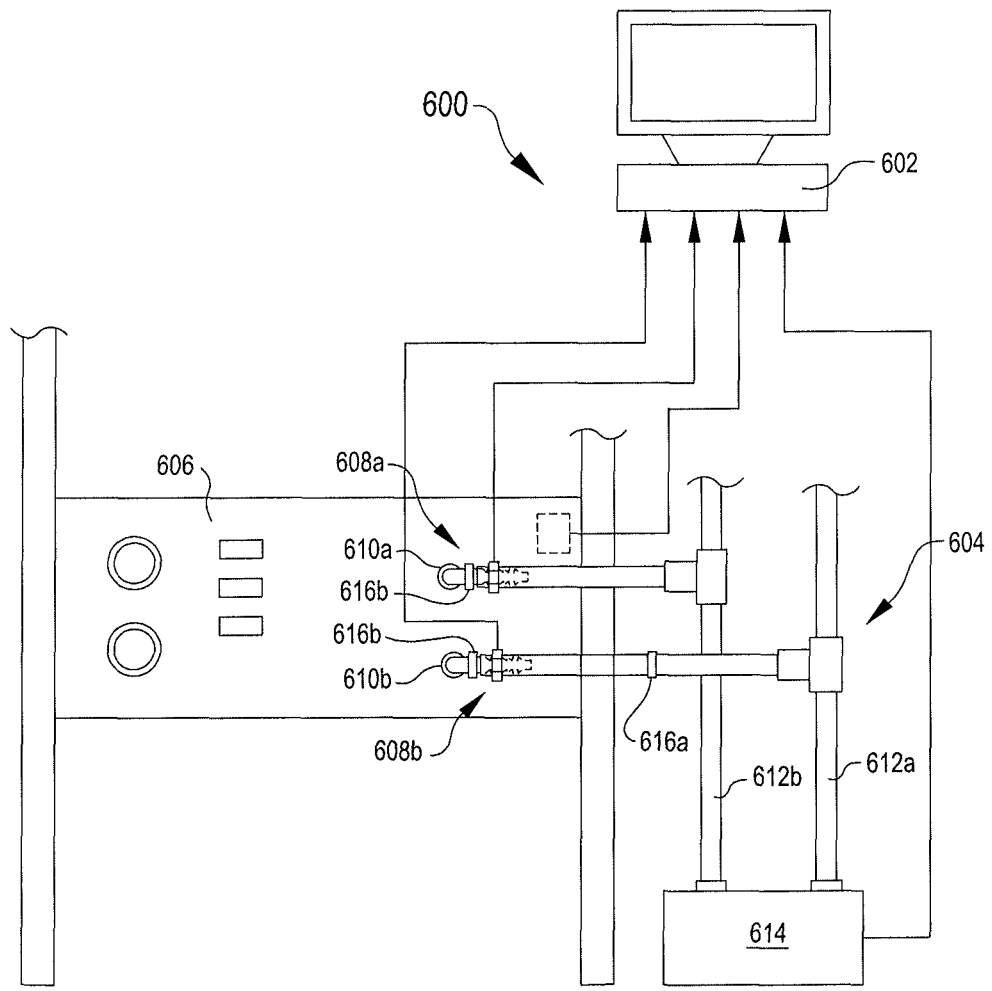

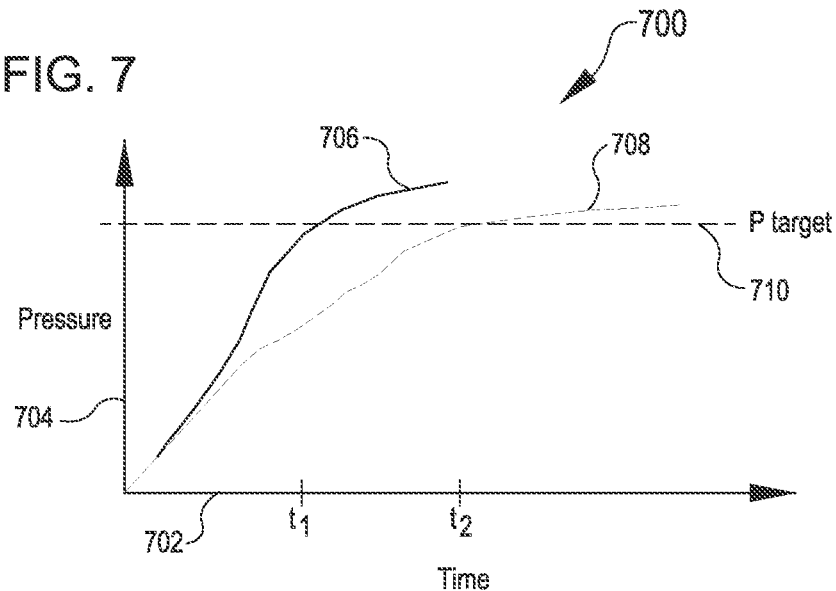
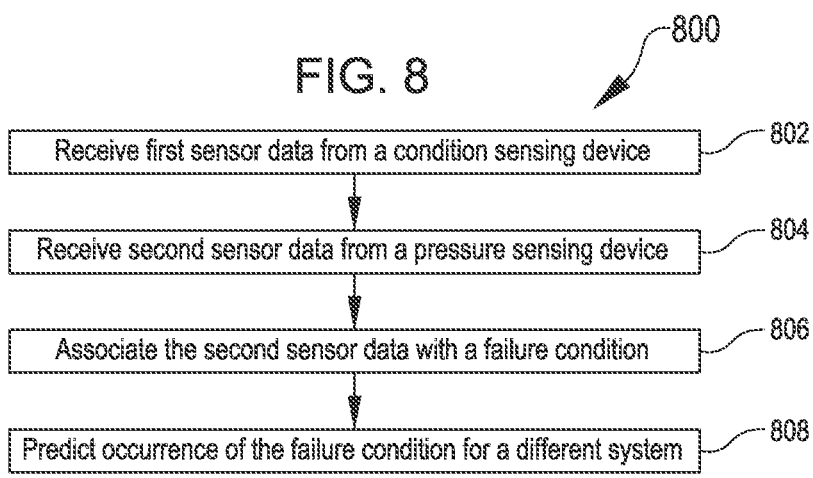
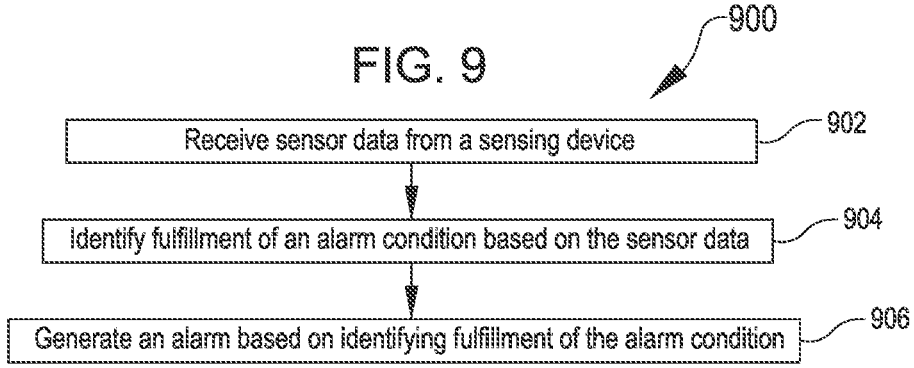

EXTERIOR TUBING MONITORING DEVICES

CROSS-REFERENCE TO RELATED APPLICATIONS

This application is related to co-pending U.S. application Ser. No. 15/588,337, filed May 5, 2017, entitled "INTERIOR TUBING MONITORING DEVICES", the contents of which are herein incorporated in their entirety.

BACKGROUND

Hoses or other flexible tubes can be used to transport liquid and gas for many different purposes. Under some circumstances, these hoses may be pressurized. For example, in a closed system including a length of hose, a pump can be used to circulate liquid, which may result in the liquid being pressurized within the hose. The hose can be coupled to other lengths of hose, pumps, outlets, inlets, devices, etc. using any one of a variety of hose fittings.

BRIEF DESCRIPTION OF THE DRAWINGS

Various examples in accordance with the present disclosure will be described with reference to the drawings, in which:

FIG. 4 illustrates a side view including a partial profile of a connection monitoring system including a sensing device, according to at least one example;

FIG. 5 illustrates an end view including a profile of the connection monitoring system including the sensing device from FIG. 4, according to at least one example;

FIG. 6 illustrates a connection analysis system including sensing devices, according to at least one example;

FIG. 7 illustrates an example graph illustrating measurements taken using sensing devices in a system such as illustrated in FIG. 6;

FIG. 8 illustrates a flow diagram depicting example acts for implementing techniques relating to monitoring connections, according to at least one example; and FIG. 9 illustrates a flow diagram depicting example acts for implementing techniques relating to monitoring connections, according to at least one example.

DETAILED DESCRIPTION

Figure 1:
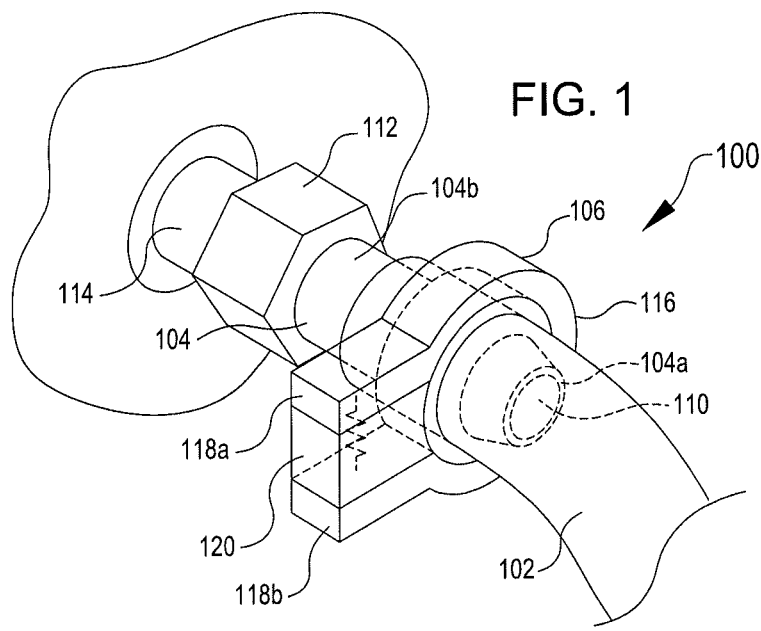
FIG. 1 illustrates a perspective view of a connection monitoring system including a sensing device, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples herein are directed to sensing devices and techniques for using the sensing devices for real-time monitoring of hose couplings (e.g., connections between hoses and fittings). In a testing phase (e.g., in a lab), real-time data from a sensing device can be used to determine a lifecycle of a particular hose coupled to a particular fitting. For example, the particular hose and the particular fitting can be tested until some failure occurs (e.g., a leak occurs at the fitting). The lifecycle data can be used to determine when parts should be replaced to avoid the same or similar failures. Under actual conditions (e.g., in a liquid cooling system in a data center), data gathered from the testing phase along with real-time data from a sensing device can be used to monitor the status of a hose and fitting combination in the liquid cooling system in the data center. This real-time monitoring can be useful to maximize the lifetime of the parts, while minimizing the risk of a failure.

Turning now to a particular example, in this example, a sensing device is provided that enables real-time monitoring of a connection between a flexible hose and a male fitting. The connection can be formed where an inside of the hose overlaps an outside of the male fitting (e.g., a press fit connection). The sensing device can be installed on the outside of the hose in this region where the overlap exists. For example, the sensing device can include a partial metal ring that extends around a majority portion of the outside of the hose. A strain gauge can be mounted between ends of the partial ring. Given this arrangement, expansion or contraction of the hose (e.g., distortion of a wall of the hose) in the overlap region can be sensed by the strain gauge. For example, expansion of the hose will force the ends of the partial ring away from each other and increase the strain sensed by the strain gauge. Contraction of the hose will force the ends towards each other and thereby decrease the strain sensed by the strain gauge. Because the connection is formed by a press fit, expansion of the outside diameter of the hose may be evidence of degradation of the hose itself or at least a loosening of the connection. For example, as a wall of the hose expands or swells, an interior surface of the wall also begins to expand. This expansion pulls the interior surface of the hose away from the outside of the male fitting, which can create a pathway for liquid to leak at the connection. The sensing device gathers data that can be used to predict a future time when such leaks are likely to occur.

Figure 2:
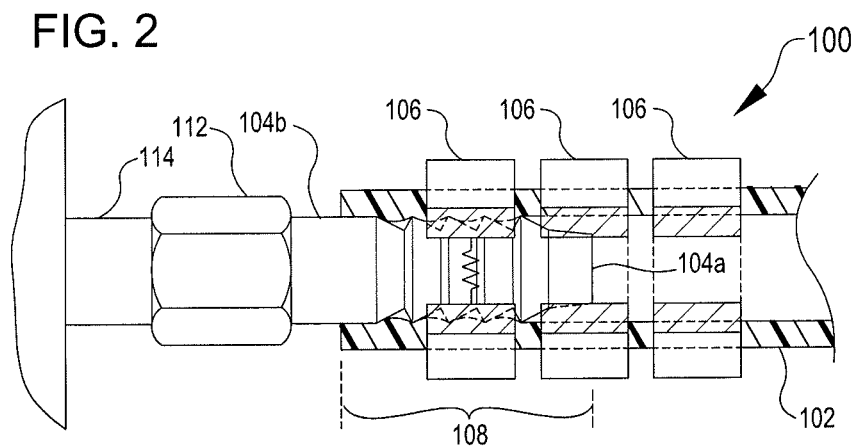
FIG. 2 illustrates a side view including a partial profile of the connection monitoring system including the sensing device from FIG. 1, according to at least one example.
Figure 3:
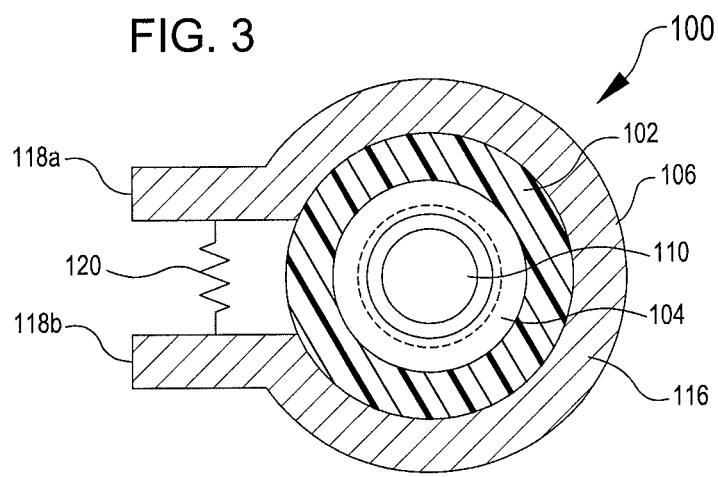
FIG. 3 illustrates an end view including a profile of the connection monitoring system including the sensing device from FIG. 1, according to at least one example.

Turning now to the figures, FIGS. 1-3 illustrate a connection monitoring system 100, according to at least one example. The connection monitoring system 100 includes a flexible tube 102 that extends over a fitting 104. The connection monitoring system 100 also includes a sensing device 106 that extends around the flexible tube 102.

In some examples, the sensing device 106 can be formed as its own part or formed as part of the flexible tube 102. For example, the flexible tube 102 and the sensing device 106 can be formed as a single part. In some examples, the flexible tube 102 includes a repeating pattern of sensing devices 106 spaced longitudinally along the length of the flexible tube 102. In this manner, if a sensing device 106 at an end of the flexible tube 102 fails or if the end of the flexible tube 102 fails (e.g., near the fitting 104), the end of the flexible tube 102 and the sensing device 106 can be severed (e.g., cut off) to enable a second sensing device 106 of the flexible tube 102 to sense present conditions between the fitting 104 and the flexible tube 102.

The flexible tube 102 can be any suitable hollow tube or hose designed to carry fluids or gases from one location to another. The flexible tube 102 can be formed from any suitable material having flexible properties. For example, the flexible tube 102 can be formed from nylon, polyurethane, polyethylene, synthetic and natural rubbers, polytetrafluoroethylene (PTFE), polyvinyl chloride, and any other material having similar properties. In some examples, the flexible tube 102 is suitably flexible to enable stretching of the flexible tube 102 over the fitting 104. In particular, an interior diameter of the flexible tube 102 may be slightly smaller than an exterior diameter of the fitting 104 to enable an interference fit between the flexible tube 102 and the fitting 104.

The fitting 104 can have a smooth exterior surface, a barbed surface, or any other suitable surface. The fitting 104 can be formed from any suitable material such as copper, brass, aluminum, plastic, polyvinyl chloride, Nylon, and any other material having similar properties. In some examples, the fitting 104 is more rigid than the flexible tube 102. The fitting 104 can include an opening 110 disposed at a distal end 104a and a connector 112 disposed at a proximal portion 104b. The opening 110 can define a receiving section to receive the flexible tube 102.

As illustrated in FIG. 2, the flexible tube 102 extends over the fitting 104 at an overlapping region 108. In some examples, the overlapping region 108 corresponds to the receiving section. In particular, the overlapping region 108 can extend between the distal end 104a and the proximal portion 104b. In some examples, the overlapping region 108 extends between the opening 110 and the connector 112. The sensing device 106 can be disposed at any location within the overlapping region 108. In some examples, a hose clamp is also disposed within the overlapping region 108 to secure the flexible tube 102 to the fitting 104.

The connector 112 can be used to connect the fitting 104 to a port 114. The port 114 can be an inlet, an outlet, or both an inlet and an outlet. In some examples, the port 114 is connected to a network component, a pump, a reservoir, a radiator, a feed line, a drain line, or any other part of a liquid circulation system.

The sensing device 106 can include a partial ring 116, a set of ends 118, and a strain gauge 120. The partial ring 116 can have a C shape. The C shape can extend circumferentially around at least a portion of an exterior surface of the flexible tube 102, with the flexible tube 102 within the interior of the C shape. The set of ends 118 is connected to the partial ring 116 and extends radially away from the partial ring 116 to define a gap between the ends 118. In some examples, the set of ends 118 extend away from the partial ring 116 in the same direction and the ends 118 may be parallel to each other.

The partial ring 116 and the set of ends 118 can be formed from more than one part or as a single part. In some examples, the partial ring 116 and the set of ends 118 are connected such that their expansion and contraction correspond to expansion, contraction, and/or other distortion of the flexible tube 102. Thus, the partial ring 116 and the set of ends 118 should be constructed of a rigid material that can hold its shape; the material selected should also exhibit properties of elastic deformation. In some examples, a radial thickness of the partial ring 116 is tuned to achieve the desired deformation. For example, if a more rigid material were selected, a thinner radial thickness may be used. In some examples, the partial ring 116 and the set of ends 118 can be formed from plastic, metal, composite materials, and any other suitable material.

The strain gauge 120 is mounted to and between the set of ends 118 at an opening between the set of ends 118. Generally, the strain gauge 120 is configured to measure strain on the set of ends 118 and the partial ring 116 as a result of expansion, contraction, and/or other distortion of the flexible tube 102. For example, because the set of ends 118 and the partial ring 116 are rigid, as the flexible tube 102 contracts, the strain gauge 120 registers a reduction in strain in the partial ring 116 and the set of ends 118. Likewise, as the flexible tube 102 expands, the strain gauge 120 registers an increase in strain in the partial ring 116 and the set of ends 118. These strain values can be correlated to any suitable measurement. For example, the strain values may be correlated to pressure between an inward surface of the sensing device 106 and an exterior surface of the flexible tube 102. The strain values may also be correlated to stress in the partial ring 116 and/or the set of ends 118. When the pressure and/or stress of the partial ring 116 and/or set of ends 118 is high, the flexible tube 102 has likely expanded, which may be a sign that the flexible tube 102 is approaching failure.

The strain gauge 120 may be any suitable sensor configured to measure strain in the partial ring 116 and/or the ends 118. In some examples, the strain gauge 120 may be a metallic electrical resistance wire gauge (e.g., a foil wire strain gauge using silicon technology, polysilicon thin film technology, bonded metal foil thick film technology, or sputtered thin film technology), a semiconductor gauge (e.g., piezoelectric), a mechanical gauge, a hydraulic gauge, an optical gauge, or any other suitable gauge. In some examples, the sensing device 106 receives and sends electrical signals via one or more wires. The wire(s) can be connected to a computing device or other system that manages operation of the sensing device 106.

FIGS. 4 and 5 illustrate a connection monitoring system 400, according to at least one example. The connection monitoring system 400 includes the flexible tube 102 that extends over the fitting 104 and a sensing device 402 that extends around the flexible tube 102. Like in the connection monitoring system 100, the sensing device 402 extends around the flexible tube 102 within the overlapping region 108.

The sensing device 402 includes a pressurized tube 404 and a pressure sensing device 406. The pressurized tube 404 extends around an exterior portion of the flexible tube 102 within the overlapping region 108. The pressurized tube 404 may be formed from a flexible material having elastic properties such as rubber, plastic, and other similar materials. The pressurized tube 404 can have a generally cylindrical shape with a hollow opening (e.g., donut shaped). When mounted, the flexible tube 102 may be disposed within the hollow opening of the pressurized tube 404. In particular, the pressurized tube 404 can be stretched over the flexible tube 102 such that an inward surface that defines the hollow opening is in physical contact with an exterior surface of the flexible tube 102.

The pressurized tube 404 includes a chamber 408. The chamber 408 can be defined by a first wall offset a first radial distance from a central axis of the pressurized tube and a second wall offset a second radial distance from the central axis. The first wall and the second wall can extend circumferentially about the central axis, and corresponding top and bottom portions can connect the first wall and the second wall.

The chamber 408 can be filled with a compressible liquid or a compressible gas. For example, the chamber 408 can be filled with high-density oil (e.g., 0.0316 pounds per cubic inch). Other compressible liquids or gases that have greater densities or lower densities may also be used. In some examples, the pressurized tube 404 may include more than one chamber 408, which may be filled with the same or different compressible fluids or gases.

The pressure sensing device 406 can be in fluid communication with the chamber 408. The pressure sensing device 406 can be configured to measure pressure within the chamber 408. In some examples, the pressurized tube 404 includes a valve and the pressure sensing device 406 is attached to the valve. In some examples, the valve is used to add and remove liquid or gas from the chamber 408. In some examples, the pressure sensing device 406 is a separate device that is used to read pressure via an access port of the pressurized tube 404.

The pressure sensing device 406 may be any suitable sensor or set of sensors configured to measure pressure within the chamber 408. Thus, the pressure sensing device 406 may be an absolute pressure sensor, a gauge pressure sensor, a differential pressure sensor, a sealed pressure sensor, or other pressure sensor. Pressure sensing technology that can be used to implement the pressure sensing device 406 includes, for example, force collector types (e.g., piezoresistive strain gauge, capacitive, electromagnetic, piezoelectric, optical, and/or potentiometric), resonant collector types, thermal collector types, ionization collector types, or other similar technologies.

When the flexible tube 102 contracts and expands, the pressure inside the pressurized tube 404 (e.g., within the chamber 408) will change accordingly. This may be a result of pressure changes between the exterior surface of the flexible tube 102 and the inward surface of the pressurized tube 404. The pressure sensing device 406 can be configured to measure pressure in the chamber 408 as that pressure varies over time. These changes in pressure can be correlated to degradation of the flexible tube 102. Thus, indicating an end of the lifecycle of the flexible tube 102.

FIG. 6 illustrates an example connection analysis system 600, according to at least one example. The connection analysis system 600 can include a computer system 602, a liquid circulation system 604, a ported component 606, and one or more connection monitoring systems 608. The connection monitoring system 608 is an example of the connection monitoring systems 100 and 400 described herein, thus, the connection monitoring systems 608 can include one or more sensing devices to monitor ports 610 (e.g., connection between flexible tubes and male fittings) of the ported component 606.

Generally, the connection analysis system 600 can be used to test the connections made at the ports 610 under simulated conditions and/or can be used to monitor the connections made at the ports 610 under live conditions. Under simulated conditions, the connection analysis system 600 may be used to run one or more tests on the connections at the ports 610 until the connections fail and record data relating to the tests and the failure. The tests can be run in a laboratory environment or some simulated, actual environment.

Under live conditions, the connection analysis system 600 may be used to monitor the connections and the ports 610 on an ongoing basis, generate alarm signals before failure occurs, and communicate such alarm signals to the appropriate systems and/or operators for responding.

To this end, the computer system 602 can be configured to gather sensor data detected by the connection monitoring systems 608, gather condition sensor data from condition sensors (e.g., leak detection sensors, liquid circulation system pressure sensors, and other sensors) of the connection analysis system 600, manage operation of the liquid circulation system 604, and/or manage operation of the ported component 606. The computer system 602 can also be configured to compute lifecycles of connections at the ports 610, predict failure of the connections at the ports 610, and perform other suitable techniques described herein.

The computer system 602 includes one or more computing devices, each of which can include a processor, memory, storage, input/output components, communications ports and/or antennas, and any other suitable component to enable the techniques described herein. The processor of the computer system 602 may be implemented as appropriate in hardware, computer-executable instructions, firmware, or combinations thereof. Computer-executable instruction or firmware implementations of the processor may include computer-executable or machine-executable instructions written in any suitable programming language to perform the various functions described.

In some examples, the processor may be a microprocessor, a digital signal processor (DSP), an application-specific integrated circuit (ASIC), field programmable gate arrays (FPGAs), state machines, or other processing means. Such processing means may further include programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

The communication ports may include a wireless communication link and may include wireless interfaces, such as IEEE 802.11, BlueTooth™, radio frequency identification (RFID), near-field communication (NFC), or radio interfaces for accessing cellular telephone networks (e.g., transceiver/antenna for accessing a CDMA, GSM, UMTS, or other mobile communications network). In some aspects, the communication ports may be a wired communication link and may include interfaces, such as Ethernet, USB, IEEE 1394, fiber optic interface, voltage signal line, or current signal line.

The liquid circulation system 604 can include a plurality of lines or hoses 612 in fluid communication with a pump 614 and the ports 610. In some examples, the pump 614 is configured to circulate a liquid into the ported component 606 via the hose 612a and the port 610a and out of the ported component 606 via the hose 612b and the port 610b. For example, the liquid circulation system 604 can be configured to provide liquid cooling to certain components such as the ported component 606 (e.g., rack-mountable server components). In some examples, the ported component 606 is part of liquid circulation system 604 (e.g., a reservoir, a radiator, etc.). The pump 614 can be any suitable pump configured to move liquid through the liquid circulation system 604. In some examples, the pump 614 pressurizes the liquid circulation system 604, but does not otherwise move liquid through the liquid circulation system 604. The liquid used in the liquid circulation system 604 may be water, glycol, water-glycol mixtures, and any other suitable liquid.

In a testing or simulated arrangement, different types of liquids, tubes, fittings, and the like can be tested under various operating conditions (e.g., temperatures, pressures, changes in temperature, changes in pressure, changes in voltage applied to pumps, changes to composition of fluids, etc.) to determine degradation of the connections (e.g., the flexible tube) at the ports 610 over time. These operating conditions can be selected to function as acceleration factors on the tests. This enables determining lifespan to failure in much less time than doing so under normal operating conditions.

As introduced herein, condition sensors can be used to sense conditions of the connection analysis system 600. Using data from the condition sensors, the computer system 602 can determine when a condition has occurred that is indicative of failure of the ports 610. For example, liquid detection sensors can be used to detect liquid at or around the ports 610. Based on this data, it can be determined that leaks have occurred at the ports 610 (e.g., a leak condition). In some examples, pressure sensors can be used to monitor the pressure within vessels of the connection analysis system 600 (e.g., flexible tubes, lines, or hoses such as the lines or hoses 612). A decrease in pressure in these vessels may be evidence of a leak within the system (e.g., at the ports 610).

In a real-time monitoring arrangement, the connection analysis system 600 can include any suitable telemeters to enable remote communications with the computer system 602 and any other components of the connection analysis system 600. For example, the connection monitoring systems 608 may include telemeters to share their data wirelessly with the computer system 602.

In some examples, the computer system 602 is part of a larger computer system that manages operation of systems within a facility such as a data center. For example, such a larger computer system may manage operation of mechanical systems (e.g., heating, ventilation, and air conditioning (HVAC), humidification, dehumidification, pressurization, etc.), electrical systems, fire suppression systems, security systems, and any other systems of the data center. In some examples, the computer system 602 and/or the larger computer system may be configured to power off/on the pump 614, depressurize/pressurize the liquid circulation system 604, power off/on the ported component 606, and perform any other changes based on sensor data received from the connection monitoring systems 608. For example, if the computer system 602 determines, based on sensor data from the connection monitoring system 608a, that the connection at the port 610a is likely to fail, the computer system 602 may send signals to the pump 614, the ported component 606, and/or other systems to avoid the failure from occurring or at least minimize its effect.

FIG. 7 illustrates an example graph 700 illustrating measurements that could be taken using sensing devices of the connection analysis system 600, according to at least one example. The graph 700 includes time along an X axis 702 and pressure along a Y axis 704. The pressure measurements along the Y axis 704 may have been collected using a connection monitoring system 608.

The graph 700 also includes two lines 706 and 708 and a pressure target 710. Each line represents results of a test taken using the connection analysis system 600. For example, the line 706 represents pressure over time under a first set of operating conditions (e.g., liquid temperature, liquid pressure, pump voltage, liquid properties (e.g., viscosity, density, etc.)) and other similar conditions. The line 708 represents pressure over time under a second set of operating conditions that may be different from the first set of operating conditions. Increase in pressure of the lines 806 and 808 may be representative of expansion or other distortion of a flexible hose and an increase in likelihood of failure of the connection between the flexible hose and a fitting. The pressure target 710 may be a measured value (e.g., a pressure measured by a sensing device at which one or more connections failed under one or more tests), a computed value (e.g., a value that is 10% less than a pressure at which connections are very likely to fail), or any other suitable value.

In any event, the pressure target 710 may be used to compare the two tests represented by the two lines 706 and 708. For example, the first test (e.g., represented by the line 706) intersects with the pressure target 710 at time 1 and the second test (e.g., represented by the line 708) intersects with the pressure target 710 at time 2. Thus, the conditions present in the second test allowed for the connection to operate for a longer duration than the first test before reaching the pressure target 710.

FIGS. 8 and 9 illustrate example flow diagrams depicting processes 800 and 900 as described herein. The processes 800 and 900 are illustrated as logical flow diagrams, each of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 8 illustrates a flow diagram depicting the process 800 for implementing techniques relating to monitoring tubing connections, according to at least one example. The computer system 602 (FIG. 6) may perform the process 800 of FIG. 8.

The process 800 may begin at 802 by receiving first sensor data from a condition sensing device. In some examples, the first sensor data indicates occurrence of a failure condition of a connection at an overlapping region between a flexible tube and a tube fitting. The occurrence of the failure condition can happen at a first time during a first time period. The first time period can be a test period.

In some examples, the first time period is associated with a first set of system operating conditions including at least one of a liquid type condition, a liquid temperature condition, an operating pressure condition, a tube permeability condition, a liquid property condition, or a circulation pump output condition. At least one of the first set of system operating conditions may function as an acceleration factor for the system.

At 804, the process 800 may include receiving second sensor data from a pressure sensing device. The second sensor data may be representative of expansion or other distortion of the flexible tube within the overlapping region as sensed by the pressure sensing device and occurring during the first time period. The pressure sensing device can be a strain gauge or a pressurized tubular chamber.

At 806, the process 800 may include associating the second sensor data with a failure condition.

At 808, the process 800 may include predicting occurrence of the failure condition for a different system. In some examples, the different system can include a different flexible tube coupled to a different tube fitting. Predicting occurrence of the failure condition may be based on associating the second sensor data with the failure condition. For example, based upon the association of the second sensor data with the failure condition (806), a new failure condition can be predicted utilizing second sensor data with the different system. For example, if a failure occurred at 20 PSI for the first system, then a failure may be predicted to be the same for the second system, or may be calculated based upon differences in the two systems.

In some examples, the flexible tube includes a liquid within the inside of the flexible tube and an interior of the tube fitting. In this example, the failure condition of the flexible tube may include a leak of some of the liquid at the overlapping region or a pressure value of the liquid in the flexible tube meeting a pressure threshold. The pressure threshold may be a high pressure threshold or a low pressure threshold. For example, if the pressure within the flexible tube meets or falls below some low pressure threshold, then the failure condition may be fulfilled.

FIG. 9 illustrates a flow diagram depicting the process 900 for implementing techniques relating to monitoring tubing connections, according to at least one example. The computer system 602 (FIG. 6) may perform the process 900 of FIG. 9.

The process 900 may begin at 902 by receiving sensor data from a sensing device. In some examples, the sensor data may be representative of an expansion, a contraction, and/or other distortion of a flexible tube at a region of the flexible tube that overlaps a male fitting. The sensing device may extend around an exterior portion of the flexible tube within the region.

At 904, the process 900 may include identifying fulfillment of an alarm condition based on the sensor data. In some examples, identifying fulfillment of the alarm condition includes identifying that a portion of the sensor data is greater than or equal to a predefined pressure value.

At 906, the process 900 may include generating an alarm based on identifying fulfillment of the alarm condition. In some examples, generating the alarm can include sending a signal to a liquid circulation system to stop circulating liquid within the flexible tube. Generating the alarm can also include sending a message to a human operator (e.g., via a user device) that identifies the failure, a location of the sensing device, and any other suitable information to enable the human operator to respond to the alarm.

Based at least in part on the disclosure and teachings provided herein, a person of ordinary skill in the art will appreciate other ways and/or methods to implement the various examples. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   a tube fitting comprising an exterior tube surface;
   a flexible tube comprising an inside and an outside, the inside of the flexible tube coupled to the exterior tube surface of the tube fitting at an overlapping region;
   a strain sensing device comprising a partial ring and a strain gauge, the partial ring extending around at least a portion of the outside of the flexible tube at the overlapping region and defining a gap between ends of the partial ring, the strain gauge extending between the ends of the partial ring;
   a condition sensing device configured to sense a condition associated with the flexible tube; and
   a computing device in communication with the strain sensing device and the condition sensing device, the computing device configured to:

receive first sensor data from the condition sensing device indicating occurrence of a failure condition of the flexible tube at a first time during a first time period;

receive second sensor data from the strain sensing device, the second sensor data representative of expansion of the flexible tube within the overlapping region as sensed by the strain gauge and occurring during the first time period; and associate the second sensor data with the failure condition.

2. The system of claim 1, wherein the computing device is further configured to predict occurrence of the failure condition for a different system comprising a different flexible tube coupled to a different tube fitting based on associating the second sensor data with the failure condition.

3. The system of claim 1, further comprising a liquid circulation system configured to provide a liquid within the flexible tube and within an interior of the tube fitting.

4. The system of claim 3, wherein the failure condition of the flexible tube comprises a leak of some of the liquid at the overlapping region or a pressure value of the liquid in the flexible tube meeting a pressure threshold.

5. The system of claim 1, wherein the first time period is associated with a first set of system operating conditions comprising a liquid type condition, a liquid temperature condition, an operating pressure condition, a tube permeability condition, or a circulation pump output condition.

6. The system of claim 1, wherein the computing device is further configured to:

receive third sensor data from the condition sensing device indicating occurrence of a second failure condition of a second flexible tube at a second time during a second time period;

receive fourth sensor data from a second strain sensing device, the fourth sensor data representative of a second expansion of the second flexible tube within a second overlapping region as sensed by the second strain sensing device and occurring during the second time period;

associate the fourth sensor data with the second failure condition; and predict occurrence of a third failure condition based on associating the second sensor data with the failure condition and associating the fourth sensor data with the second failure condition.

7. A flexible tube, comprising:
a first end and a second end;
an opening at the first end, the opening defining a receiving section to receive a male fitting; and
a sensing device extending around an exterior portion of the flexible tube adjacent to the receiving section, wherein the sensing device is configured to sense an expansion or a contraction of the flexible tube at the receiving section by expanding responsive to the expansion of the flexible tube or contracting responsive to the contraction of the flexible tube.

8. The flexible tube of claim 7, wherein the sensing device comprises a partial ring and a strain gauge, the partial ring extending around at least a portion of the exterior portion of the flexible tube at the receiving section and defining a gap between ends of the partial ring, the strain gauge extending between the ends of the partial ring.

9. The flexible tube of claim 8, wherein the strain gauge comprises a metallic wire gauge or a semiconductor gauge.

10. The flexible tube of claim 7, wherein the sensing device comprises:

a pressurized tube extending around the exterior portion of the flexible tube within at the receiving section, wherein a chamber of the pressurized tube is filled with a compressible liquid or a compressible gas; and a pressure sensing device in fluid communication with the chamber and configured to measure pressure within the chamber.

11. The flexible tube of claim 7, wherein the expansion of the flexible tube at the receiving section is indicative of a leak between the flexible tube and the male fitting.

12. The flexible tube of claim 7, wherein:
the sensing device is a strain sensing device; and
the strain sensing device is configured to share sensor data with a computing device, the computing device configured to associate the sensor data with a failure of the flexible tube, the sensor data representative of the expansion of the flexible tube at the receiving section as sensed by the strain sensing device.

13. The flexible tube of claim 7, wherein:
the sensing device is a first sensing device; and
the flexible tube further comprises a second sensing device extending around a different exterior portion of the flexible tube adjacent to the first sensing device such that the first sensing device is disposed between the opening and the second sensing device.

14. The flexible tube of claim 13, wherein the flexible tube is severable at a longitudinal location between the first sensing device and the second sensing device.

15. The flexible tube of claim 7, wherein the flexible tube is configured to carry a liquid to a network component in which the male fitting is attached.

16. A system, comprising:
a network component comprising a fitting;
a liquid circulation system comprising a flexible tube attached to the fitting to form a connection between the flexible tube and the fitting, the liquid circulation system configured to circulate a liquid to the network component via the connection;
a sensing device extending about an exterior surface of the flexible tube within an overlapping region where a portion of the flexible tube extends over at least a portion of the fitting to form the connection, wherein the sensing device is configured to sense an expansion or a contraction of the flexible tube at the overlapping region by expanding responsive to the expansion of the flexible tube or contracting responsive to the contraction of the flexible tube; and
a computing device in communication with the sensing device, the computing device configured to:
receive sensor data from the sensing device, the sensor data representative of the expansion or the contraction of the flexible tube within the overlapping region;
identify fulfillment of an alarm condition based on the sensor data; and
generate an alarm based on identifying fulfillment of the alarm condition.

17. The system of claim 16, wherein identifying fulfillment of the alarm condition comprises identifying that a pressure value described by the sensor data is greater than or equal to a predefined pressure value.

18. The system of claim 16, wherein generating the alarm comprises sending a signal to the liquid circulation system to stop circulating the liquid.

19. The system of claim 16, wherein the flexible tube is attached to the fitting via a hose clamp.

20. The system of claim 16, wherein the liquid circulation system comprises a liquid cooling system to cool the network component.

* * * * *